US006666007B2

(12) United States Patent
Schroeder

(10) Patent No.: US 6,666,007 B2
(45) Date of Patent: Dec. 23, 2003

(54) HYDRO-MECHANICAL VARIABLE SPEED FEEDER/HEADER DRIVE FOR AN AGRICULTURAL COMBINE

(75) Inventor: Jay D. Schroeder, Coal Valley, IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/015,315

(22) Filed: Dec. 12, 2001

(65) Prior Publication Data

US 2003/0109292 A1 Jun. 12, 2003

(51) Int. Cl.$^7$ ................................................ A01F 12/28
(52) U.S. Cl. .......................... 56/10.6; 56/11.1; 56/11.9
(58) Field of Search .......................... 56/10.6, 10.9, 56/11.1, 11.3

(56) References Cited

U.S. PATENT DOCUMENTS

| | | | |
|---|---|---|---|
| 3,093,946 A | 6/1963 | Pitt et al. ........................ 56/20 |
| 3,145,584 A | * 8/1964 | Fairbank et al. ................ 474/1 |
| 3,535,859 A | * 10/1970 | Adams ........................ 56/10.4 |
| 3,736,732 A | 6/1973 | Jennings et al. ............. 56/10.9 |
| 3,999,359 A | 12/1976 | Jordan et al. ................ 56/27.5 |
| 4,483,128 A | 11/1984 | Hawkins ...................... 56/11.1 |
| 5,865,700 A | * 2/1999 | Horsch ........................ 475/72 |
| 5,947,818 A | 9/1999 | Satzler ........................... 460/6 |
| 6,059,656 A | 5/2000 | Satzler ....................... 460/116 |
| 6,213,870 B1 | 4/2001 | Satzler ........................... 460/6 |
| 6,247,295 B1 | * 6/2001 | Hansen et al. ........... 56/10.2 A |

* cited by examiner

Primary Examiner—Robert E. Pezzuto
Assistant Examiner—Meredith Petravick
(74) Attorney, Agent, or Firm—John William Stader; Collin A. Webb; Brant T. Maurer

(57) ABSTRACT

A variable speed, reversible drive for rotating elements of a feeder and a header of an agricultural combine including a first rotatable power input, a second rotatable power input, and a planetary gear arrangement or set including a first rotatable input, a second rotatable input, and a rotatable output, the rotatable elements of the feeder and the header being connected to the rotatable output of the planetary gear arrangement for rotation thereby. The drive includes a forward clutch having a rotatable input and a rotatable output selectably engageable for joint rotation, and a brake or reverse clutch having a rotatable input selectably engageable with a fixed element for limiting rotation thereof, the first rotatable input of the planetary gear arrangement being connected to the rotatable output of the forward clutch and to the brake input for rotation therewith, the input of the forward clutch being connected to the first rotatable power input for rotation therewith, and the second rotatable input of the planetary gear arrangement being connected to the second power input for rotation therewith.

16 Claims, 3 Drawing Sheets

US 6,666,007 B2

HYDRO-MECHANICAL VARIABLE SPEED FEEDER/HEADER DRIVE FOR AN AGRICULTURAL COMBINE

TECHNICAL FIELD

This invention relates generally to feeder and header drives of agricultural combines, and more particularly, to a reversible hydro-mechanical variable speed drive which allows varying the speed of the feeder and header independent of engine speed.

BACKGROUND ART

Currently, feeder and header drives for agricultural combines typically utilize a variable ratio belt and chain drive system for varying the operational speed of the feeder and header.

However, variable ratio belt and chain drives typically used for power transmission to feeders and headers have limited speed ranges and less than desirable speed control, and can suffer from reliability problems, namely slippage in the instance of belt drives, and breakage in the instance of both drives, particularly when transmitting significant levels of power under varying loads such as when crop population and loads are large and/or weeds are encountered.

Therefore, what is sought is a hydromechanical drive for a feeder and header which provides a significant increase in power capability compared to known feeder and header drives, a wider speed range, better speed control, and a built-in reverse capability.

SUMMARY OF THE INVENTION

A variable speed, reversible drive for rotating elements of a feeder and a header of an agricultural combine which provides many of the sought after capabilities is disclosed. The variable speed drive includes a first rotatable power input, a second rotatable power input, and a planetary gear arrangement or set including a first rotatable input, a second rotatable input, and a rotatable output, the rotatable elements of the feeder and the header being connected to the rotatable output of the planetary gear arrangement for rotation thereby. The drive includes a forward clutch having a rotatable input and a rotatable output selectably engageable for joint rotation, and a brake or reverse clutch having a rotatable input selectably engageable with a fixed element such as a case of the drive for limiting or preventing rotation of the brake input, the first rotatable input of the planetary gear arrangement being connected to the rotatable output of the forward clutch and to the brake input for rotation therewith, the input of the forward clutch being connected to the first power input for rotation therewith, and the second rotatable input of the planetary gear arrangement being connected to the second power input for rotation therewith.

In operation, when the first power input and the second power input are rotated while the brake is disengaged, the input and the output of the forward clutch can be engaged to rotatably connect the first power input to the first rotatable input of the planetary gear arrangement for rotating the rotatable elements of the feeder and the header in a first rotational direction at a speed that can be varied by varying a speed of the rotation of the second power input. Alternatively, the brake can be engaged while the input and the output of the forward clutch are disengaged for rotating the elements of the feeder and header in a second rotational direction opposite the first rotational direction, the speed of rotation in this direction also being variable by varying the speed of rotation of the second power input.

Preferably, the first power input is connected to a power source rotating at a substantially constant speed such as an internal combustion engine of the combine, and the second power input is connected to a power source rotatable at a variable speed, such as a variable speed hydraulic motor or the like connected to a hydraulic pump for receiving pressurized hydraulic fluid therefrom, one of the hydraulic motor or pump having a displacement variable for varying the rotational speed of the hydraulic motor.

DETAILED DESCRIPTION OF THE INVENTION

Figure 1:
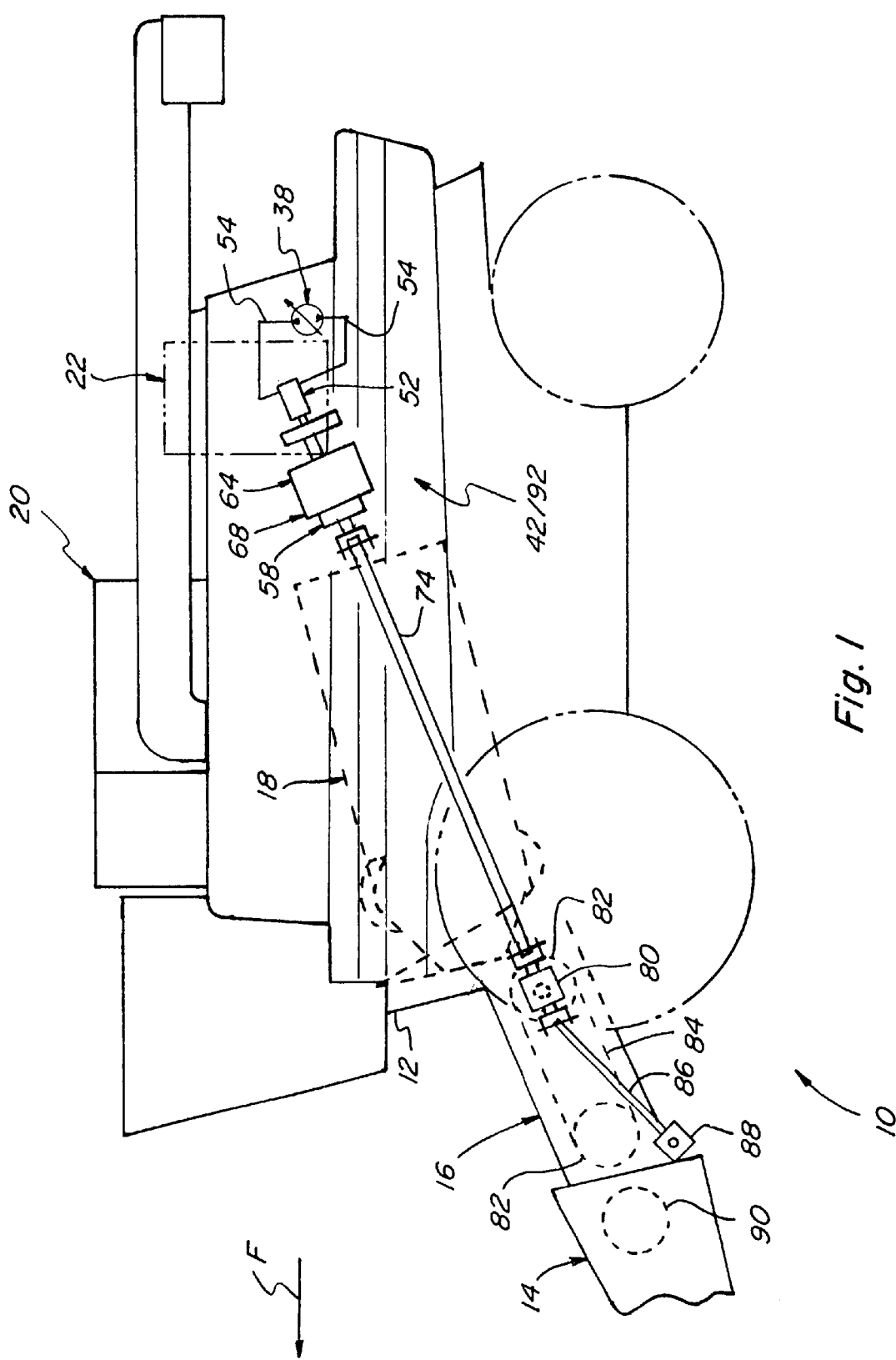
FIG. 1 is a simplified side elevational view of an agricultural combine including a variable speed feeder and header drive according to the present invention.
Figure 2:
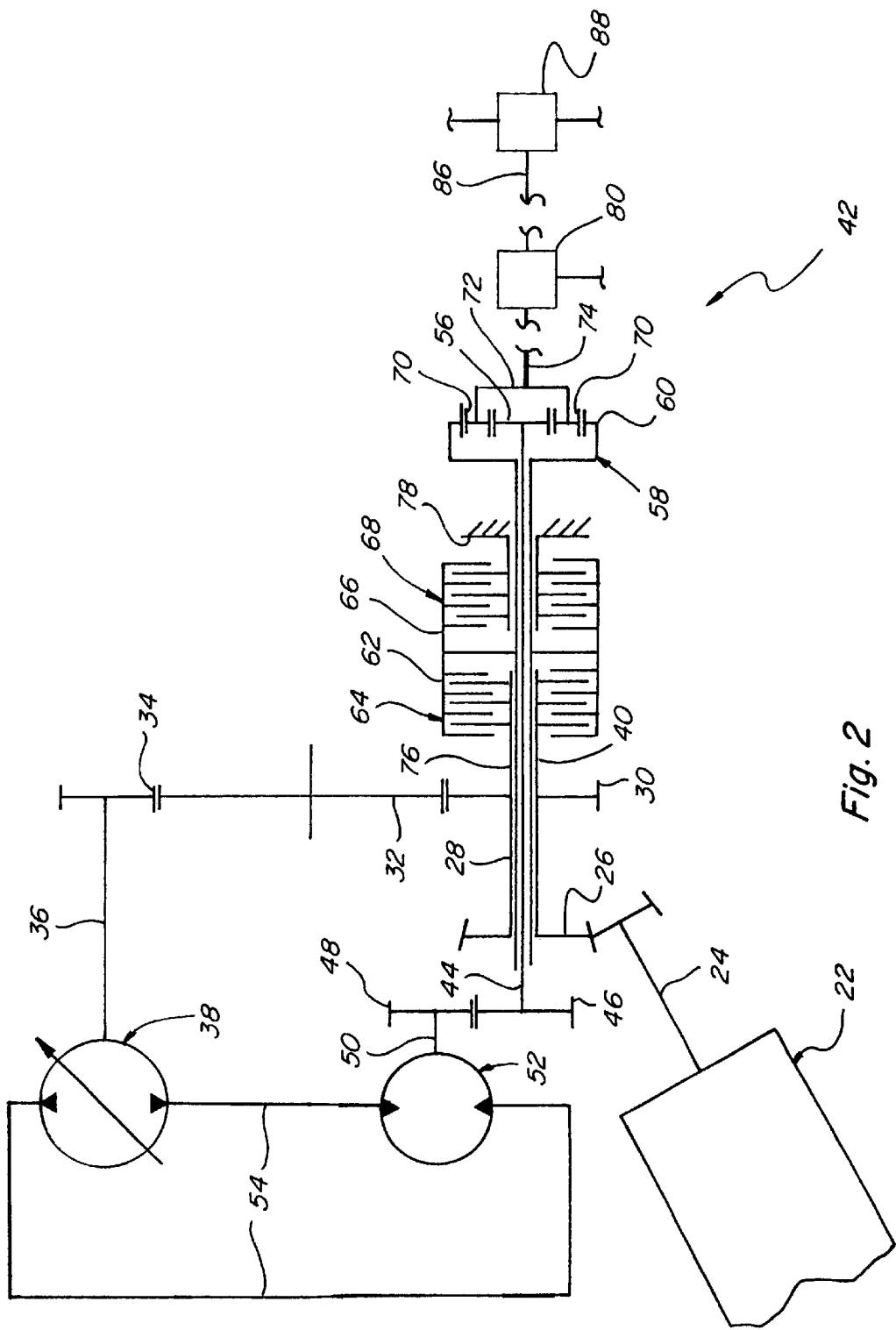
FIG. 2 is a simplified schematic representation of the drive of FIG. 1.

Referring now to the drawings, in FIG. 1 a self propelled agricultural combine moveable in a forward direction, denoted by arrow F, for harvesting and separating crops, such as, but not limited to, grains including rice, wheat, soy beans, and corn, is shown. Combine 10 includes a forward end 12 carrying a conventional header 14 extending transversely thereacross in close proximity to the ground for gathering and cutting or otherwise separating crop materials or desired potions thereof from root structure thereof in the ground. The crop or plant or potions thereof are conveyed by header 14 to a feeder 16 which conveys the plant material to a separator 18 which separates the grains or their crops from the other plant material and foreign material, the crops either being temporarily collected in a bin 20 on machine 10 or discharged to an accompanying wagon or truck (not shown).

Combine 10 is propelled by a conventional power plant such as an internal combustion engine 22 and a hydraulic and/or mechanical drive train (not shown) in the well known conventional manner. Engine 22 is rotatably drivingly connected to an engine output 24 which here is depicted as a bevel gear mounted on an output shaft of the engine. Engine output 24 is enmeshed in rotatably driving relation with a bevel gear 26 mounted on a drive shaft 28 for rotation therewith, drive shaft 28 also including a drive gear 30 mounted thereon for rotation therewith enmeshed with a transfer gear 32 which, in turn, is enmeshed with an input gear 34 on a rotatable input shaft 36 of a variable displacement hydraulic pump 38, such that engine 22 will rotatably drive pump 38.

Drive shaft 28 is also connected to a first rotatable power input 40 of a variable speed drive 42 constructed and operable according to the teachings of the present invention for rotatably driving header 14 and feeder 16. Variable speed drive 42 includes a second rotatable power input 44 including an input gear 46 enmeshed with an output gear 48 mounted on an output shaft 50 of a hydraulic motor 52 for rotation therewith, motor 52 being connected in fluid communication with hydraulic pump 38 by fluid lines 54 for receiving pressurized fluid therefrom. Second input 44 is connected to a rotatable sun gear 56 of a planetary gear arrangement or set 58 for rotating sun gear 56, thereby providing a hydrostatic power input to planetary gear set 58. Planetary gear set 58 includes a rotatable ring gear 60 which is connected to a rotatable output 62 of a forward clutch 64 and also to a rotatable input 66 of a reverse clutch or brake 68. Planetary gear set 58 includes a plurality of planet gears 70 mounted for rotation on a rotatable carrier 72 in the conventional manner, an output shaft 74 being connected to carrier 72 for rotation therewith and extending to and connecting with the rotatable elements of header 14 and feeder 16, as will be discussed below. Forward clutch 64 includes a rotatable input 76 selectably engageable with output 62 thereof, input 76 being connected to first power input 40 for rotation therewith, such that when input 76 and output 62 are engaged, power from a mechanical source will be transmitted through forward clutch 64 from first power input 40 to ring gear 60 of planetary gear set 58. Input 66 of reverse brake 68 is selectably engageable with a fixed, non-rotating element 78 such as a case of drive 42 or brake 68 for limiting or preventing rotation of input 66 and thus output 62 of forward clutch and ring gear 60 of planetary gear set 58.

Rotatable elements of header 14 and feeder 16 will expectedly vary from combine to combine and for different grains and crops, but for the non-limiting representative purposes here will typically include a gear arrangement such as a right angle drive 80 connected in rotatably driving relation to one or more rollers or sprockets 82 encircled by an endless belt or chain 84 of feeder 16 operable for conveying the crop upwardly and rearwardly from header 14 to separator 18 in the well known manner. Right angle drive 80 is also connected to and rotatably drives a transfer shaft 86 which extends forwardly to a gear arrangement or drive 88 of header 14, which, in turn, is connected to and rotatably drives one or more augers 90, gathering chains, sickles, and/or other elements (not shown), also in the well known manner.

Figure 3:
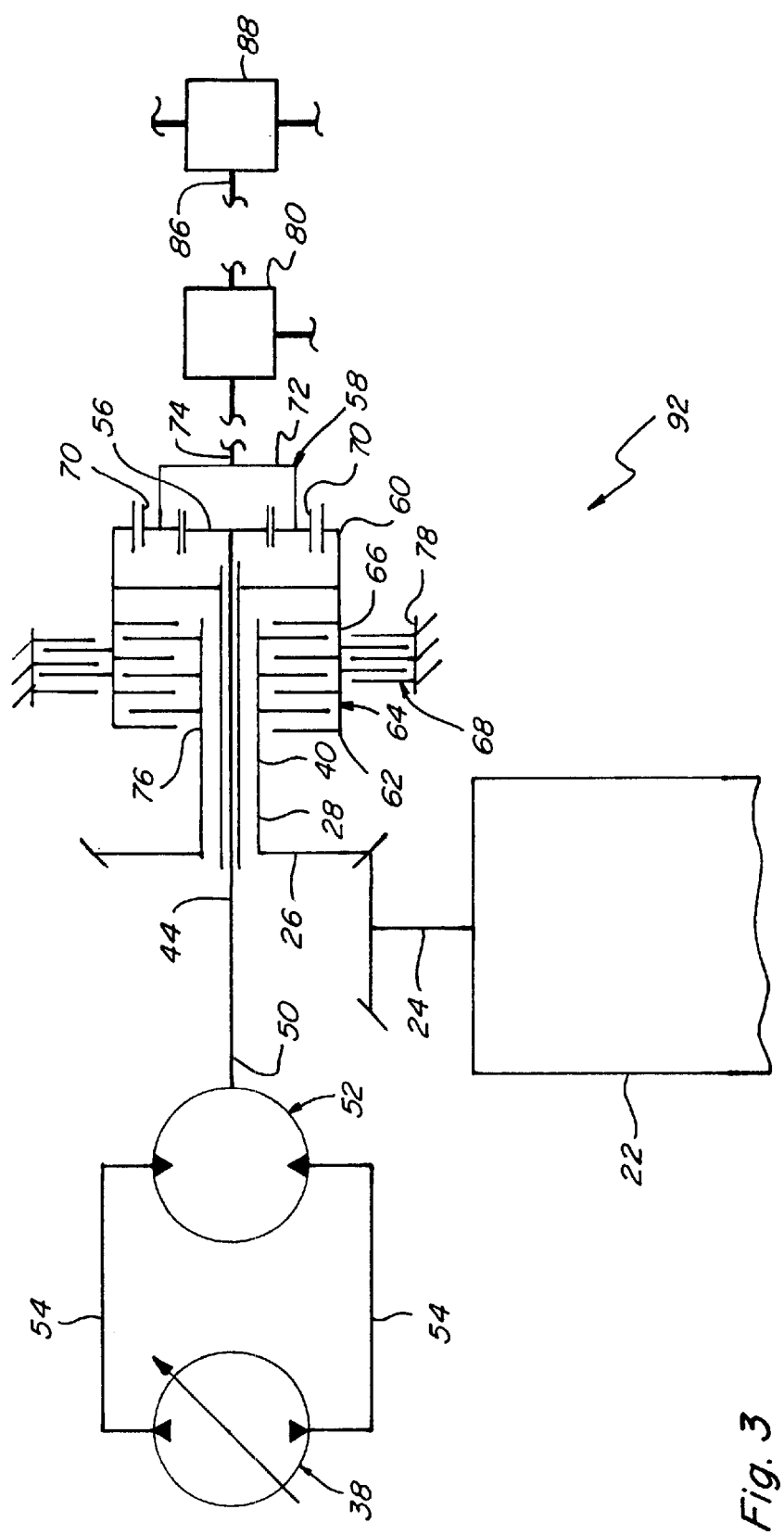
FIG. 3 is a simplified schematic representation of an alternative variable speed feeder and header drive for the combine of FIG. 1.

Turning to FIG. 3, an alternative variable speed drive 92 constructed and operable according to the teachings of the present invention for rotatably driving the rotatable elements of header 14 and feeder 16 is shown, like parts of drive 92 and drive 42 being identified by like part numbers. In FIG. 3, output 24 of engine 22 is enmeshed as explained above in rotatably driving relation with a bevel gear 26 mounted on a drive shaft 28 for rotating therewith, but variable displacement hydraulic pump 38 is not shown as being rotated by shaft 28 via transfer gear 32. This illustrates that pump 38 can be rotated by any desired power source in any desired manner. Drive shaft 28 is connected to a first rotatable power input 40 of variable speed drive 92. Variable speed drive 92 includes a second rotatable power input 44 connected to an output shaft 50 of a hydraulic motor 52 for rotation therewith, motor 52, as before, being connected in fluid communication with hydraulic pump 38 by fluid lines 54 for receiving pressurized fluid therefrom. Second input 44 is connected to a rotatable sun gear 56 of a planetary gear arrangement or set 58 for rotating sun gear 56. Planetary gear set 58 includes a rotatable ring gear 60 which is connected to a rotatable output 62 of a forward clutch 64 and also to a rotatable input 66 of a reverse clutch or reverse brake 68. Planetary gear set 58 includes a plurality of planet gears 70 mounted for rotation on a rotatable carrier 72 in the conventional manner, an output shaft 74 being connected to carrier 72 for rotation therewith and extending to and connecting with the rotatable elements of header 14 and feeder 16. Forward clutch 64 includes a rotatable input 76 selectably engageable with output 62 thereof, input 76 being connected to first power input 40 for rotation therewith, such that when input 76 and output 62 are engaged, power will be transmitted through forward clutch 64 from first power input 40 to ring gear 60 of planetary gear set 58. Input 66 of reverse brake 68 is selectably engageable with a fixed, non-rotating element 78 for limiting or preventing rotation of input 66 and thus output 62 of forward clutch and ring gear 60 of planetary gear set 58, again in the manner explained above.

In operation of either drive 42 or drive 92, with first and second power inputs 40 and 42 rotating, when input 76 and output 62 of forward clutch 64 are engaged and input 66 of brake 68 is disengaged from non-rotating element 78, hydromechanical power from engine 22 and hydraulic motor 52 is transmitted via power inputs 40 and 44 and planetary gear set 58 to output shaft 74 and thus to drives 80 and 88 of feeder 16 and header 14, respectively, for rotatably driving the rotatable elements 82, 84, 86, and 90 thereof. Typically, it is desirable to operate engine 22 at a substantially constant speed, because other aspects of combine 10 are also being powered thereby. The rotational speed of hydraulic motor 52, however, can be easily varied by altering an angular position of an internal swash plate (not shown) of variable displacement pump 38, as is well known. As a result, this will vary the rotational speed of second power input 44 and thus sun gear 56 connected thereto, which will vary the rotational speed of planet gears 70, carrier 72, output shaft 74, and drives 80 and 88 of feeder 16 and header 14 and elements 82, 84, 86, and 90 thereof, in a forward or normal operating direction. The rotational speeds of these latter elements can thus be precisely controlled through a relatively wide, continuous range of operating speeds simply by varying the swash plate angle of hydraulic pump 38, without requiring changing belt ratios and the like, as was required using other known feeder and header drives. Additionally, the components of drives 42 and 92 are reliable, and not typically subject to slippage and breakage.

When it is desired to operate header 14 and feeder 16 in the reverse direction, for instance, for unclogging feeder 16 when overloaded or choked with crop and/or weeds or other matter, with first and second power inputs 40 and 42 rotating, input 76 and output 62 of forward clutch 64 can be disengaged and input 66 of brake 68 engaged with non-rotating element 78, such that only hydrostatic power from hydraulic motor 52 is transmitted via power input 44 and sun gear 56 to planet gears 70 and carrier 72 of planetary gear set 58, to output shaft 74 and thus to drives 80 and 88 of feeder 16 and header 14, respectively, and rotatable elements 82, 84, 86, and 90 thereof, and the direction of rotation is reverse or opposite of the forward direction. Also, because the only driving power is from motor 52, the rotational speed of elements 82, 84, 86, and 90 is much slower compared to when the mechanical power is additionally provided. Further, because the rotational speed of hydraulic motor 52 is simply variable by varying the swash plate angle of pump 38, the rotational speeds of the rotatable elements 82, 84, 86, and 90 in the reverse direction are correspondingly variable.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A variable speed, reversible drive for rotating elements of a feeder and a header of an agricultural combine, comprising:
   a first rotatable power input;
   a second rotatable power input;
   a planetary gear arrangement including a first rotatable input, a second rotatable input, and a rotatable output, the rotatable elements of the feeder and the header being connected to the rotatable output of the planetary gear arrangement for rotation thereby;
   a forward clutch having a rotatable input and a rotatable output selectably engageable for joint rotation;
   a brake having a rotatable brake input selectably engageable with a fixed element for limiting rotation of the brake input;
   the first rotatable input of the planetary gear arrangement being connected to the rotatable output of the forward clutch and to the brake input for rotation therewith, the input of the forward clutch being connected to the first rotatable power input for rotation therewith, and the second rotatable input of the planetary gear arrangement being connected to the second power input for rotation therewith;
   wherein when the first power input and the second power input are rotated while the brake is disengaged the input and the output of the forward clutch can be engaged to rotatably connect the first power input to the first rotatable input of the planetary gear arrangement for rotating the rotatable elements of the feeder and the header in a first rotational direction at a rotational speed that can be varied by varying a speed of the rotation of the second power input; and
   wherein the brake can be engaged while the input and the output of the forward clutch are disengaged for rotating the elements of the feeder in a second rotational direction opposite the first rotational direction.

2. The drive of claim 1, wherein when the brake is engaged and the input and the output of the clutch are disengaged a rotational speed of the elements of the feeder can be varied by varying the rotational speed of the second power input.

3. The drive of claim 1, wherein the first input of the planetary gear arrangement comprises a ring gear, the second input of the planetary gear arrangement comprises a sun gear, and the output of the planetary gear arrangement comprises a carrier supporting a plurality of planet gears for rotation thereon.

4. The drive of claim 1, wherein the rotating power source comprises an internal combustion engine of the combine, and the second power input is connected to a hydraulic motor for rotation thereby.

5. The drive of claim 4, wherein the hydraulic motor is connected to a variable displacement hydraulic pump for receiving pressurized hydraulic fluid therefrom, the displacement of the pump being variable for varying the rotational speed of the hydraulic motor.

6. The drive of claim 1, wherein the rotatable elements of the feeder include at least a right angle drive connected in rotatably driving relation to a roller or a sprocket encircled by an endless chain, and the rotatable elements of the header comprise at least a drive connected in rotatably driving relation to at least one auger.

7. The drive of claim 6, wherein the right angle drive is connected in rotatably driving relation to the drive of the header by a transfer shaft.

8. The drive of claim 7, wherein the output shaft comprises an elongate shaft extending from the planetary gear arrangement to the right angle drive of the feeder.

9. A feeder and header for an agricultural combine, comprising: elements rotatable for harvesting and gathering crops from a field as the combine is moved thereover and elements rotatable for conveying the crops to a threshing apparatus of the combine; and
   a planetary gear set having a rotatable output including an output shaft connected in rotatably driving relation to the rotatable elements, the planetary gear set including a first rotatable input and a second rotatable input, the first rotatable input being connected in rotatably driven relation to a variable speed motor, and the second rotatable input being connected in rotatably driven relation to a rotatable output of a selectably engageable forward clutch and to a selectably engageable brake, the forward clutch including a rotatable input connected in rotatably driven relation to a second motor rotatable at a substantially constant speed, such that the forward clutch can be engaged while the brake is disengaged for rotating the rotatable elements in directions for harvesting and gathering crops from a field as the combine is moved thereover and for conveying the crops to the threshing apparatus at rotational speeds which are variable by varying the rotational speed of the variable speed motor, and such that the forward clutch can be disengaged and the brake engaged for rotating at least the elements for conveying the crops in a direction away from the threshing apparatus by the rotation of the variable speed motor.

10. The feeder and header of claim 9, wherein the variable speed motor is a hydraulic motor and the second motor is an internal combustion engine.

11. The feeder and header of claim 9, wherein the output of the planetary gear set comprises a planetary gear carrier, the first input comprises a sun gear, and the second input comprises a ring gear.

12. The feeder and header of claim 9, wherein a speed of the rotation of the elements for conveying the crops into the threshing apparatus can be varied by varying the rotational speed of the variable speed motor.

13. The feeder and header of claim 12, wherein the variable speed motor is a hydraulic motor connected to a hydraulic pump for receiving pressurized fluid therefrom, and one of the hydraulic pump or the hydraulic motor has a displacement which is variable for varying the rotational speed of the hydraulic motor.

14. A variable speed feeder and header for an agricultural combine, comprising:
   a header including elements rotatable for harvesting and gathering crops from a field as the combine is moved thereover;
   a feeder positioned for receiving the harvested and gathered crops from the header and including elements rotatable for conveying the crops to a threshing apparatus of the combine; and
   a planetary gear set including an output connected by a shaft in rotatably driving relation to the rotatable elements of the feeder and the header, a first rotatable input connected in rotatably driven relation to a first motor, and a second rotatable input connected in rotatably driven relation to a rotatable output of a forward clutch and to a rotatable input of a reverse clutch selectably engageable with a fixed output thereof, the forward clutch including an input selectably engageable with the output thereof and connected in rotatably driven relation to a second motor, such that the input and the output of the forward clutch can be engaged while the input and the output of the reverse clutch are disengaged for rotating the rotatable elements of the feeder and the header in a first direction at a rotational speed variable by varying the rotational speed of the first motor, and such that the input and output of the forward clutch can be disengaged and the input and output of the brake engaged for rotating the rotatable elements of the feeder and the header in a second direction opposite the first direction by the rotation of the first motor.

15. The variable speed feeder and header of claim 14, wherein a speed of rotation of the rotatable elements of the feeder and the header in the second direction can be varied by varying a speed of rotation of the first motor.

16. The variable speed feeder and header of claim 14, wherein the first motor is a hydraulic motor connected to a hydraulic pump operable for supplying pressurized hydraulic fluid to the hydraulic motor, the speed of rotation of the hydraulic motor being variable by varying the displacement of the hydraulic pump or the hydraulic motor.

* * * * *